Feb. 18, 1936.     P. MANCHESTER     2,031,542
EXTENDED ELECTRICAL OUTLET
Filed Dec. 15, 1933
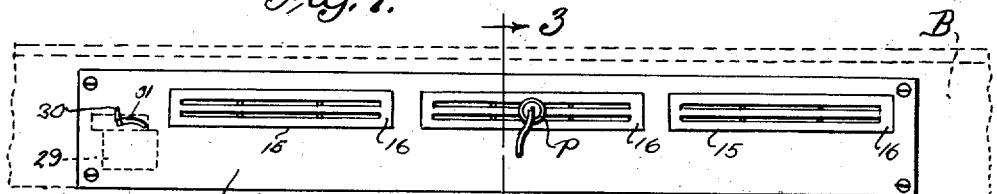
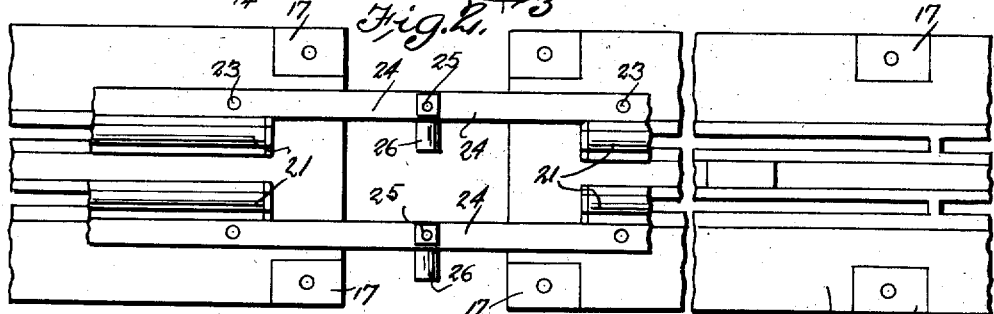
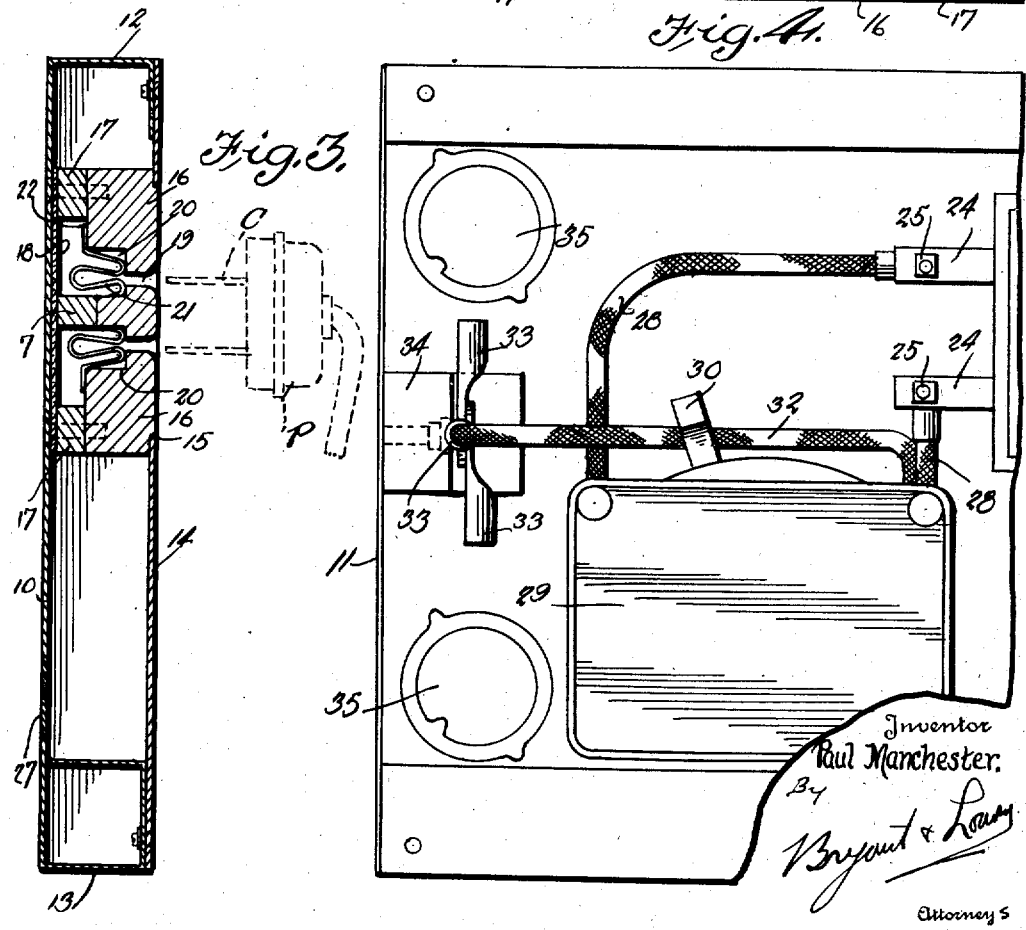
Inventor
Paul Manchester.
By
Bryant & Lowry
Attorneys Patented Feb. 18, 1936

2,031,542

UNITED STATES PATENT OFFICE 2,031,542

EXTENDED ELECTRICAL OUTLET

Paul Manchester, Pawtucket, R. I.

Application December 15, 1933, Serial No. 702,571

1 Claim. (Cl. 247—3)

This invention relates to certain new and useful improvements in extended electrical outlets.

The primary object of this invention is to provide an electrical outlet of the type usually set into the base board of a room wall and is of extended form to facilitate attachment thereto of various electric fixtures such as floor lamps, radios, vacuum cleaners, electric plugs and the like and eliminating the unsightly appearance of extension cords customarily trailed around the base board of a room and over the floor area thereof, a plurality of electrical fixtures being associated with the single outlet of extended form.

It is a further object of the invention to embody in an extended outlet of the foregoing character, an automatic over-current protecting device or cut-out to function in the presence of an overload and to eliminate the burning out of the usual main service fuses.

A still further object of the invention is to provide a rear wall of the box of the extended outlet with a plurality of knock-outs for the passage of under plaster or other concealed wiring extension for the supply of electric current to wall bracket lighting fixtures, wall or mantel electric clocks and for other purposes as may be desired.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a fragmentary front elevational view of the base board of a room wall with the extended electrical outlet set therein;

Figure 2 is a fragmentary rear elevational view showing means for the attachment of under plaster or concealed wiring to the spring contact strips of the outlet;

Figure 3 is a vertical cross-sectional view taken on line 3—3 of Figure 1, showing the outlet box with spring contact strip therein and an attachment plug illustrated by dotted lines in position to be engaged with the contact strip; and Figure 4 is a fragmentary front elevational view with the cover plate of the outlet box removed, to illustrate the automatic over-current protecting device or overload cut-out.

Referring more in detail to the accompanying drawing, there is illustrated an extended electrical outlet especially designed for association with the floor board B of a room wall as illustrated by dotted lines in Figure 1, the outlet including a box of elongated rectangular form having a rear wall 10, end walls 11, top and bottom walls 12 and 13 respectively and a removable face plate 14 that preferably lies flush with the base board B. The face plate 14 is provided with a series of longitudinally spaced horizontally aligned slotted openings 15 and said outlet box has an elongated block 16 therein with the edges thereof mitered to project into the openings 15 to lie flush with the face of the front wall 14 of the box as shown in Figure 3. A spacer plate 17 is interposed between the block 16 and rear wall 10 of the box and an insulation sheet 18 is interposed between the spacer plate 17 and the rear wall 10.

As shown in Figures 1 and 3, the insulation block 16 is provided with pairs of parallel slotted openings 19 extending lengthwise thereof and respectively communicating with recesses 20 at the rear side of the insulation block, the recesses 20 providing seats for looped spring contact strips 21 having one side edge seated in the recess 20 and the other side edge 22 extending over the rear face of the insulation block 16 to be fastened thereto as at 23 by riveting or the like. An extension contact strip 24 is carried by each looped contact strip 21 with adjacent ends of the extensions connected together as at 25 and carrying at said connection a lug 26 or the like to facilitate attachment of under plaster or concealed wiring extensions for wall bracket fixtures or the like. As illustrated by dotted lines in Figure 3, the connector plug P has the blade contact C positioned for passage through the slots 19 of the insulation block 16 for engagement with the looped spring contact strips 21 and the latter may be engaged by the blade contacts C at any point over the length of the several slots 19 as will at once be apparent from an inspection of Figure 1. The under plaster or concealed wiring may be introduced into the outlet box by way of the knock-outs 27 shown in Figure 3 for attachment to the lugs 26.

As shown in Figure 4, a pair of end extension contact strips 24 have wire connections 28 with an automatic over-current protecting device or cut-out 29 that functions in addition to the main service fuses. The protecting device or cut-out 29 has the usual hand control lever 30 extending through an arcuate slot 31 in the front wall 14 of the outlet box as shown in Figure 1. This circuit breaker may be of the type, well known in the art, in which the adjustment of the overload rating is sealed against tampering by unauthorized persons. A conductor 32 extends from the protecting device or cut-out to connectors 33 that are mounted upon an insulation block 34 for attachment of main current wires that extend into the box through the knock-outs 35.

From the above detailed description of the invention, it is believed that the construction and use thereof will at once be apparent, it being apparent that a plurality of electrical appliances may be placed into electrical communication with the single extended electrical outlet, under plaster extensions are possible and protection is offered for over-current or over-load by the automatic cut-out device.

While there is herein shown and described the prefered embodiment of the invention, it is nevertheless to be understood that minor changes may be made therein without departing from the spirit and scope of the invention as claimed.

I claim:—

A combined junction and distribution box for building construction designed for elimination of fuse plugs, comprising an elongated casing adapted for wall mounting and for housing electrical wires for necessary circuit connections, a plurality of outlets in the casing for electrical appliances and an automatic circuit breaker in the casing operative to prevent overload of the wires connected in the circuit the circuit breaker being of the type which is sealed against unauthorized adjustment of the overload mechanism.

PAUL MANCHESTER.